(12) United States Patent
Sebire et al.

(10) Patent No.: US 12,137,464 B2
(45) Date of Patent: Nov. 5, 2024

(54) CONFIGURED GRANT ACTIVATION FOR UPLINK TRANSMISSION IN WIRELESS COMMUNICATION

(71) Applicant: Nokia Technologies Oy, Espoo (FI)

(72) Inventors: Benoist Sebire, Tokyo (JP); Samuli Turtinen, Ii (FI); Chunli Wu, Beijing (CN); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 375 days.

(21) Appl. No.: 17/635,753

(22) PCT Filed: Aug. 16, 2019

(86) PCT No.: PCT/CN2019/101178
§ 371 (c)(1),
(2) Date: Feb. 16, 2022

(87) PCT Pub. No.: WO2021/031005
PCT Pub. Date: Feb. 25, 2021

(65) Prior Publication Data
US 2022/0295538 A1     Sep. 15, 2022

(51) Int. Cl.
*H04W 72/23* (2023.01)
*H04L 5/00* (2006.01)

(52) U.S. Cl.
CPC ........... *H04W 72/23* (2023.01); *H04L 5/0098* (2013.01)

(58) Field of Classification Search
CPC ............. H04W 52/0206; H04W 28/04; H04W 72/1268; H04W 72/14; H04W 72/23;
(Continued)

(56) References Cited

U.S. PATENT DOCUMENTS

2018/0270698 A1    9/2018  Babaei et al.
2018/0288746 A1    10/2018 Zhang et al.
(Continued)

FOREIGN PATENT DOCUMENTS

CN    104081856 A    10/2014
CN    110050500 A    7/2019
(Continued)

OTHER PUBLICATIONS

"Configured grant Type 1 operation with BWP switch", Huawei, HiSilicon, 3GPP TSG-RAN WG2 Meeting AH 1801, R2-1801039, Jan. 2018, 2 pages.
(Continued)

*Primary Examiner* — Rushil P. Sampat
(74) *Attorney, Agent, or Firm* — Lippes Mathias LLP

(57) ABSTRACT

Systems, methods, apparatuses, and computer program products for user equipment are provided. A method may include determining to transmit, upon data arrival on a logical channel, the data on a configured grant for the logical channel. The method may also include transmitting, based on the determination, the data on the configured grant to activate a cell. In an example embodiment, the transmission on the configured grant may be performed regardless of a current activation status of the cell for which the configured grant is configured, or a suspend status of the configured grant.

16 Claims, 3 Drawing Sheets

(58) Field of Classification Search
CPC .... H04W 72/12; H04L 1/1864; H04L 1/1893; H04L 1/1822; H04L 1/1877; H04L 5/0098; Y02D 30/70
See application file for complete search history.

(56) References Cited

U.S. PATENT DOCUMENTS

| | | | | |
|---|---|---|---|---|
| 2018/0295643 | A1* | 10/2018 | Lee | H04L 5/0055 |
| 2018/0367255 | A1 | 12/2018 | Jeon et al. | |
| 2018/0368132 | A1 | 12/2018 | Babaei et al. | |
| 2018/0368157 | A1* | 12/2018 | Jeon | H04W 72/044 |
| 2018/0368175 | A1 | 12/2018 | Jeon et al. | |
| 2019/0053260 | A1 | 2/2019 | Shaheen | |
| 2019/0246421 | A1 | 8/2019 | Zhou et al. | |
| 2020/0314745 | A1* | 10/2020 | Yi | H04W 72/1268 |

FOREIGN PATENT DOCUMENTS

| | | |
|---|---|---|
| EP | 3478019 A | 5/2019 |
| JP | 2013509791 A | 3/2013 |
| WO | WO 2018/200632 A1 | 11/2018 |
| WO | WO-2019/014003 A1 | 1/2019 |
| WO | WO-2019/138913 A1 | 7/2019 |

OTHER PUBLICATIONS

"Intra UE prioritization for UL grants", ASUSTek, 3GPP TSG-RAN WG2 Meeting #105, R2-1901039, Feb.-Mar. 2019, 3 pages.

"Prioritization between Data Resources", 3GPP TSG-RAN WG2 Meeting #106, R2-1906792(Resubmission of R2-1904919), May 2019, 4 pages.

3GPP TSG RAN WG2 #75, Aug. 22-26, 2011, Athens, Greece, R2-114433, "Initiating RACH procedure on SCell for multiple TA", HY mMobile Inc., 4 pgs.

3GPP TSG-RAN WG2 Meeting #106, Reno, Nevada, USA, May 13-17, 2019, R2-1907608, "Scheduling enhancements for TSC traffic", Intel Corporation, 3 pgs.

"3rd Generation Partnership Project; Technical Specification Group Radio Access Network; NR; NR and NG-RAN Overall Description; Stage 2 (Release 15)", 3GPP TS 38.300, V15.6.0, Jun. 2019, pp. 1-99.

"3rd Generation Partnership Project; Technical Specification Group Radio Access Network; NR; Medium Access Control (MAC) protocol specification (Release 15)", 3GPP TS 38.321, V15.6.0, Jun. 2019, pp. 1-78.

U.S. Appl. No. 62/146,065, "User Equipment Based Secondary Cell Activation", filed on Apr. 10, 2015, pp. 1-13.

"3rd Generation Partnership Project; Technical Specification Group Radio Access Network; NR; Requirements for support of radio resource management (Release 16)", 3GPP TS 38.133, V16.0.0, Jun. 2019, 1001 pages.

"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.

Office Action received for corresponding Chinese Patent Application No. 201980101413.X, dated Jun. 3, 2024, 8 pages of Office Action and no page of translation available.

"Offline discussions for enhanced configured grant PUSCH transmissions", 3GPP TSG RAN WG1 Meeting #96, R1-1903707, Agenda Item: 7.2.6.3, NTT DOCOMO, Inc., Feb. 25-Mar. 1, 2019, pp. 1-82.

* cited by examiner

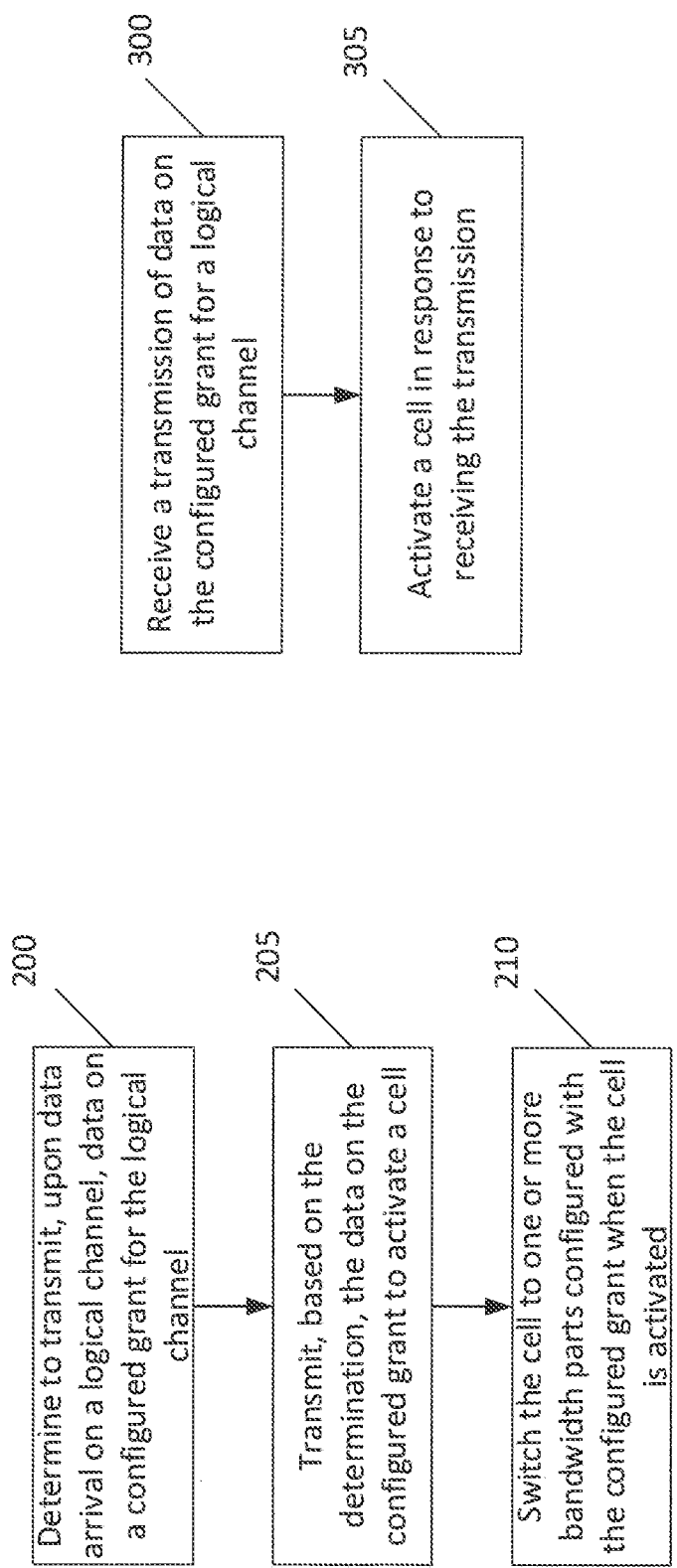

CONFIGURED GRANT ACTIVATION FOR UPLINK TRANSMISSION IN WIRELESS COMMUNICATION

CROSS REFERENCE TO RELATED APPLICATION

This patent application is a U.S. National Stage application of International Patent Application Number PCT/CN2019/101178 filed Aug. 16, 2019 which is hereby incorporated by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for user equipment (UE) configured grant activation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

One embodiment may be directed to a method. The method may include, determining to transmit, upon data arrival on a logical channel, the data on a configured grant for the logical channel. Transmitting, based on the determination, the data on the configured grant to activate a cell. In an example embodiment, the transmission on the configured grant may be performed regardless of a current activation status of the cell for which the configured grant is configured, or a suspend status of the configured grant.

Another example embodiment may be directed to an apparatus. The apparatus may include means for determining to transmit, upon data arrival on a logical channel, the data on a configured grant for the logical channel. The apparatus may also include means for transmitting, based on the determination, the data on the configured grant to activate a cell. In an example embodiment, the transmission on the configured grant may be performed regardless of a current activation status of the cell for which the configured grant is configured, or a suspend status of the configured grant.

Another example embodiment may be directed to an apparatus which may include at least one processor and at least one memory including computer program code. The at least one memory and the computer program code may be configured to, with the at least one processor, cause the apparatus at least to, determine to transmit, upon data arrival on a logical channel, the data on a configured grant for the logical channel. The apparatus may also be caused to transmit, based on the determination, the data on the configured grant to activate a cell. In an example embodiment, the transmission on the configured grant may be performed regardless of a current activation status of the cell for which the configured grant is configured, or a suspend status of the configured grant.

In accordance with some example embodiments, a non-transitory computer readable medium can be encoded with instructions that may, when executed in hardware, perform a method. The method may include determining to transmit, upon data arrival on a logical channel, the data on a configured grant for the logical channel. The method may also include transmitting, based on the determination, the data on the configured grant to activate a cell. In an example embodiment, the transmission on the configured grant may be performed regardless of a current activation status of the cell for which the configured grant is configured, or a suspend status of the configured grant.

In accordance with some example embodiments, a computer program product may perform a method. The method may include determining to transmit, upon data arrival on a logical channel, the data on a configured grant for the logical channel. The method may also include transmitting, based on the determination, the data on the configured grant to activate a cell. In an example embodiment, the transmission on the configured grant may be performed regardless of a current activation status of the cell for which the configured grant is configured, or a suspend status of the configured grant.

In accordance with some example embodiments, an apparatus may include circuitry configured to determine to transmit, upon data arrival on a logical channel, the data on a configured grant for the logical channel. The apparatus may also include circuitry configured to transmit, based on the determination, the data on the configured grant to activate a cell. In an example embodiment, the transmission on the configured grant may be performed regardless of a current activation status of the cell for which the configured grant is configured, or a suspend status of the configured grant.

In accordance with some example embodiments, a method may include receiving, from a user equipment, a transmission of data on a configured grant for a logical channel. The method may also include activating a cell in response to receiving the transmission. In an example embodiment, the transmission on the configured grant is received regardless of a current activation status of the cell for which the configured grant is configured, or a suspend status of the configured grant.

In accordance with some example embodiments, an apparatus may include means for receiving, from a user equipment, a transmission of data on a configured grant for a logical channel. In an example embodiment, the apparatus may also include activating a cell in response to receiving the transmission. In an example embodiment, the transmission on the configured grant is received regardless of a current activation status of the cell for which the configured grant is configured, or a suspend status of the configured grant.

In accordance with some example embodiments, an apparatus may include at least one processor and at least one memory including computer program code. The at least one memory and the computer program code may be configured to, with the at least one processor, cause the apparatus at least to receive, from a user equipment, a transmission of data on a configured grant for a logical channel. The apparatus may also be caused to activate a cell in response to receiving the transmission. In an example embodiment, the transmission on the configured grant may be received regardless of an activation status of a cell for which the configured grant is configured, or a suspend status of the configured grant.

In accordance with some example embodiments, a non-transitory computer readable medium can be encoded with instructions that may, when executed in hardware, perform a method. The method may include receiving, from a user equipment, a transmission of data on a configured grant for a logical channel. The method may also include activating a cell in response to receiving the transmission. In an example embodiment, the transmission on the configured grant may be received regardless of an activation status of a cell for which the configured grant is configured, or a suspend status of the configured grant.

In accordance with some example embodiments, a computer program product may perform a method. The method may include receiving, from a user equipment, a transmission of data on a configured grant for a logical channel. The method may also include activating a cell in response to receiving the transmission. In an example embodiment, the transmission on the configured grant may be received regardless of an activation status of a cell for which the configured grant is configured, or a suspend status of the configured grant.

In accordance with some embodiments, an apparatus may include circuitry configured to receiving, from a user equipment, a transmission of data on a configured grant for a logical channel. The apparatus may also include circuitry configured to activate a cell in response to receiving the transmission. In an example embodiment, the transmission on the configured grant may be received regardless of an activation status of a cell for which the configured grant is configured, or a suspend status of the configured grant.

BRIEF DESCRIPTION OF THE DRAWINGS

For proper understanding of example embodiments, reference should be made to the accompanying drawings, wherein:

FIG. 2 illustrates a flow diagram of a method, according to an example embodiment.

FIG. 3 illustrates a flow diagram of another method, according to an example embodiment.

DETAILED DESCRIPTION

Figure 1:
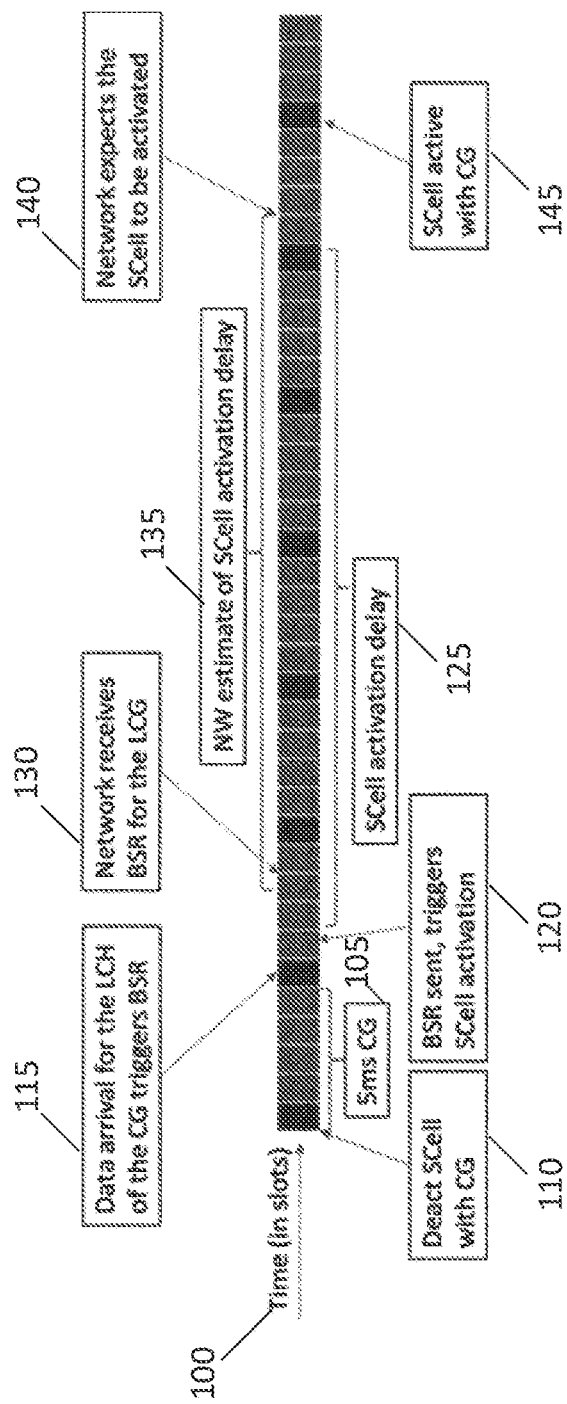
FIG. 1 illustrates a timing of a SCell activation triggered by data arrival for a logical channel of a configured grant, according to an example embodiment.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for user equipment (UE) based configured grant activation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

The current architecture in LTE networks is fully distributed in the radio and fully centralized in the core network. The low latency applications and services in 5G require to bring the content close to the radio which leads to local breakout and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), and critical communications (autonomous vehicles, traffic safety, real-time analytics, time-critical control, healthcare applications).

In Long Term Evolution (LTE), a configured grant (CG) may be supported on a primary cell (PCell). However, in NR Rel-15, CG may be supported for a secondary cell (SCell) as well. In addition to the traditional semi-persistent scheduling (SPS) activation/deactivation with downlink control information (DCI) (Type 2 CG), NR may also define Type 1 CG with periodicity and resources that may all be configured by radio resource control (RRC) without DCI activation/deactivation.

In uplink (UL) scheduling, the gNB may dynamically allocate resources to UEs via a cell radio network temporary identifier (C-RNTI) on physical downlink control channel(s) (PDCCH). In addition, a UE may monitor the PDCCH(s) in order to find possible grants for UL transmission when its downlink (DL) reception is enabled (activity governed by discontinuous reception (DRX) when configured). Further, when carrier aggregation (CA) is configured, the same C-RNTI may apply to all serving cells.

Furthermore, with CGs, the gNB may allocate UL resources for the initial hybrid automatic repeat request (HARQ) transmissions to UEs. In this regard, two types of configured UL grants may be defined. The first type is Type 1, where RRC may directly provide the configured UL grant, which may also include the periodicity. The second type is Type 2, where RRC may define the periodicity of the configured UL grant while PDCCH addressed to configured scheduling RNTI (CS-RNTI) may either signal and activate the configured UL grant, or deactivate it. For example, a PDCCH addressed to CS-RNTI may indicate that the UL grant may be implicitly reused according to the periodicity defined by RRC until it is deactivated.

The dynamically allocated UL transmission may override the configured UL grant in the same serving cell. In particular, this may occur if they overlap in time. Otherwise, an UL transmission according to the configured UL grant may be assumed, if activated. Additionally, retransmissions other than repetitions may explicitly be allocated via PDCCH(s).

When CA is configured, there may be one or more configured UL grant signaled per serving cell. When a bandwidth adaptation (BA) is configured, at one or more configured UL grant may be signaled per bandwidth part (BWP). Further, on each serving cell, there may only be one configured UL grant active at a time. A configured UL grant for one serving cell may be either Type 1 or Type 2. For Type 2, activation and deactivation of the configured UL grants may be independent among the serving cells. Further, when the SCell is deactivated, the Type 1 CG may also be suspended, and the Type 1 CG may resume when the SCell is activated.

If an SCell activation/deactivation medium access control (MAC) control element (CE) is received activating the SCell, then any suspended configured UL grants of CG Type 1 associated with this SCell may be (re-)initialized according to stored configurations. Otherwise, if an SCell activation/deactivation MAC CE is received deactivating the SCell, or if the SCellDeactivationTimer associated with the activated SCell expires, any configured UL grant Type 1 associated with the SCell may be suspended. Furthermore, multiple CG on different cells/same cells with logical channel (LCH) restrictions have been described for I-IoT to provide resource isolation for different services.

When the SCell for the CG of a LCH is deactivated (e.g., for power saving purposes), and data becomes available for transmission for that LCH, the UE may first trigger a scheduling request (SR) procedure to request UL resources to send the buffer status report (BSR) reflecting data arrival. However, in certain example embodiments, LCH to CG is not restricted to a one to one mapping. Once a grant is received, the UE may send the BSR to the gNB. When the gNB receives the BSR, the gNB may then activate the SCell, which resumes the CG. However, this procedure results in certain complications including, for example, introducing long delays even though the CG resources have already been configured on the SCell.

According to certain example embodiments, the UE may make a determination to transmit, upon data arrival on an LCH (e.g., making data available for transmission), the data to a network node on a CG configured for the LCH (via link control protocol (LCP) restrictions). In an example embodiment, based on the determination, the UE transmit the data on the configured grant to activate the SCell. In another example embodiment, the transmission on the configured grant may be performed regardless of a current SCell activation status for which the CG is configured, and/or suspend status of that CG. According to one example embodiment, the SCell may be in a deactivated state during the determination to transmit data. According to other example embodiments, additional conditions or restrictions may be put in place. Some of these conditions may include, for example, that only the LCH(s) for which a BSR is triggered may be considered, or the LCH(s) that are associated with a logical channel group (LCG) (i.e., LCH(s) which can trigger a BSR).

Another condition may be that transmission on a CG may only occur if the LCH cannot be transmitted right away on any other serving cell. For example, there may be a requirement for an SR procedure to be triggered. In an example embodiment, this does not preclude having an available grant on another serving cell, but mapping data on such a grant may be restricted from the given LCH with data. Additionally, a condition may be that only when the data volume exceeds a configured threshold, can the transmission take place. A further condition may be that the BWP switching may occur either before or after the BSR is sent (to make any interruptions more predictable to the network).

According to certain example embodiments, if multiple CGs are used (possibly on multiple SCells), prioritization rules may be introduced to select the CG. For example, in an example embodiment, the non-suspended CGs may be prioritized (i.e., those that were not explicitly suspended but only via an SCell deactivation event). According to another example embodiment, among the suspended CGs, the CG corresponding to the highest numerology and/or largest BWP may be used and/or the highest resource allocation. In addition, according to an example embodiment, the SCell/CG with the next allocation in time may be selected. Further, in another example embodiment, the prioritization rules may consider the CG that can accommodate the most (in terms of LCHs) of the data in the buffer, and the CG for which the highest priority LCH with data may be mapped or the LCH that triggered the new BSR. In addition, according to certain example embodiments, the prioritization rules may consider network (NW) configured order of prioritization (depending on the LCP restrictions), and consider a combination of any of the above rules.

In an example embodiment, when transmitting on a CG, the corresponding SCell may be activated as well. If the SCell is currently on a BWP without PDCCH monitoring (e.g., dormant BWP or BWP without active PDCCH configuration), the UE may switch the SCell to the BWP that is used when the SCell is activated (e.g., the BWP indicated via the field firstActiveBWP of the SCell, the same BWP as the BWP where the CG is configured or another BWP according to rules of BWP usage). Based on the reception of the UL transmission on the CG, the gNB may know the SCell is activated or is being activated, and know the corresponding BWP the UE has switched to.

According to an example embodiment, to ensure in-sync UL transmission, the UE based autonomous resume of the CG on a deactivated SCell and activation of the SCell may be allowed if the timing advance group (TAG) the SCell belongs to has UL in-sync (i.e., time alignment timer (TAT) timer for the TAG is running). According to a further example embodiment, the NW may configure whether such behavior for a UE is allowed, as well as on which CGs/SCells. In addition, to allow resource sharing for the CG, RRC may configure whether C-RNTI MAC CE needs to be included in the first transmission when the UE resumes transmission on the CG.

In an example embodiment, SCell activation may take a certain amount of time. The delay may be variable and may depend on whether the SCell is known or unknown. In addition, an SCell may be known when the UE has been able to measure it prior to its activation (i.e., the UE may be able to acquire synchronization signal block (SSB)/channel state information reference signal (CSI-RS) from the SCell, and has a stored measurement value). Otherwise, the SCell activation time may be dominated by the synchronization signal block based radio resource management (RRM) measurement timing configuration (SMTC) value, which refers to the periodicity with which the SSB is transmitted for the SCell. This may be because to synchronize to the cell and perform channel estimation for PDCCH/physical downlink shared channel (PDSCH), the UE may need to receive the SSB first. In addition, the requirements may also differ for frequency range 1 (FR1) and frequency range 2 (FR2) SCells due to the difference in transmission and reception (i.e., FR2 transmissions may be beamformed, which may require the UE to perform power-consuming beam search first to acquire synchronization to the measured cell). However, in an example embodiment, given that in this case it may be assumed that the SCell is configured, it may also be assumed to be known so the activation requirements are less for FR2 since the UE has been able to measure the Scell before the activation. Thus, overall, the SCell activation time may be known to be between certain minimum and maximum times. For example, SMTC_min+5 ms and SMTC_min+SMTC_max_5 ms for FR1, and T-MAC_CE+T_finetiming+2 ms and T_MAC_CE+T_finetiming+T_uncertainty as per the NR Rel-15 RAN4 requirements. From these, it may be calculated what the minimum and maximum SMTC periodicities are, for example, in the above case 10 ms and 160 ms respectively. This may suggest that the minimum and maximum SCell activation time is known, for example, from 15 ms to 645 ms in total as per above.

According to an example embodiment, the BWP switch via DCI in SCell (e.g., in case the dormant SCell→activated SCell transition causes BWP change) may also have some timing requirements. However, while these times may depend on the service capability server (SCS) of the BWP, the overall time may be reasonably small compared to the SCell activation time: the BWP switching time length may be from 0.75 ms to 3 ms in total as per current NR Rel-15 RAN4 requirements.

The SCell activation or BWP switch in the SCell may create some interruptions on the other serving cells of the UE. The interruption durations of these interruptions may depend on the SCS of the victim cell. However, the interruption length may be known to range from 0.5 ms to 2 ms in total. In certain cases, the exact time of when the interruption happens may not be known by the network.

According to certain example embodiments, the above requirements on SCell activation, BWP switching, and interruption durations may have some consequences in practice. For example, the SCell may not be activated yet when the network receives the BSR. However, the network may be able to estimate when the SCell will be available based on the information from the UE. Another consequence may be that the BWP switch and SCell activation may cause an interruption on the PCell or other serving cells. The effect of such interruptions may increase in the block error ratio (BLER) of PDCCH/PDSCH. However, this may be expected to be small since the event may not occur soon.

FIG. 1 illustrates a timing of the SCell activation triggered by data arrival for the LCH of the CG, according to an example embodiment. As illustrated, FIG. 1 illustrates time slots 100. Within a 5 ms CG period at 105, the SCell with CG may be deactivated at 110. At 115, data may arrive for the LCH of the CG, which triggers BSR. At 120, the BSR may be sent to the gNB/network, which may trigger SCell activation. After triggering SCell activation, an SCell activation delay for a specified time period may occur at 125. During the SCell activation delay, the gNB/network may receive the BSR for the LCG at 130. In addition, as illustrated in FIG. 1, the SCell activation delay 125 overlaps at least partially with a NW estimate of the SCell activation delay 135. Further, at the end of the NW estimated SCell activation delay, the NW may, at 140, expect the SCell to be activated. The SCell may become active with CG at 145, which may occur toward an end of the time slots 100.

FIG. 2 illustrates an example flow diagram of a method, according to an example embodiment. In certain example embodiments, the flow diagram of FIG. 2 may be performed a mobile station and/or UE, for instance similar to apparatus 10 illustrated in FIG. 4(a). According to one example embodiment, the method of FIG. 2 may include initially, at 200, determining to transmit, upon data arrival on a logical channel, the data on a configured grant for the logical channel. At 205, the method may include transmitting, based on the determination, the data on the configured grant to activate a cell. The method may also include, at 205, switching the cell to one or more bandwidth parts configured with the configured grant when the cell is activated. In an example embodiment, the transmission on the configured grant may be performed regardless of a current activation status of the cell for which the configured grant is configured, or a suspend status of the configured grant.

In an example embodiment, the cell may be in a deactivated state during the determimantion to transmit the data is configured on the logical channel. In another example embodiment, the transmitting may include transmitting a buffer status report to a network node to trigger activation of the cell. According to an example embodiment, the cell may enter an activation delay for a set amount of time prior to entering a fully active state with the configured grant.

According to a further example embodiment, the transmission may be performed according to one or more conditions. In an example embodiment, the one or more conditions may include that the logical channel is not immediately transmitted on any other cell, or that a volume of the data exceeds a configured threshold. According to another example embodiment, the logical channel may include a plurality of configured grants, and a configured grant among the plurality of configured grants may be selected according to one or more prioritization rules. In a further example embodiment, the one or more prioritization rules may include on-suspended configured grants are prioritized to be selected, among suspended configured grants, the configured grant with the highest numerology, largest bandwidth part, or highest resource allocation is selected, the configured grant with the next allocation in time is selected, the configure grant that can accommodate the most of the data is selected, the configured grant for which a highest priority logical channel with data can be mapped or the logical channel that triggers the buffer status report is selected, or the configured grant is selected by a network.

FIG. 3 illustrates a flow diagram of another method, according to an example embodiment. In an example embodiment, the method of FIG. 3 may be performed by a network entity or network node in a 3GPP system, such as LTE or 5G-NR. For instance, in an example embodiment, the method of FIG. 3 may be performed by a network node, a base station, eNB, or gNB, for instance similar to apparatus 20 illustrated in FIG. 4(b).

According to an example embodiment, the method of FIG. 3 may include initially, at 300, receiving, from a user equipment, a transmission of data on a configured grant for a logical channel. In an example embodiment, the data may include a buffer status report. The method may also include, at 305, activating a cell in response to receiving the transmission. In an example embodiment, the transmission on the configured grant may be received regardless of a current activation status of the cell for which the configured grant is configured, or a suspend status of the configured grant.

According to an example embodiment, the cell may be in a deactivated state before the transmission on the configured grant. In an example embodiment, the data received on the configured grant may include a buffer status report. According to another example embodiment, the cell may enter an activation delay for a set amount of time prior to entering a fully active state with the configured grant. In an example embodiment, the transmission may be received according to one or more conditions. According to an example embodiment, the one or more conditions may include that the logical channel is not immediately transmitted on any other cell, or that a volume of the data exceeds a configured threshold. In another example embodiment, the logical channel may include a plurality of configured grants. In a further example embodiment, a configured grant among the plurality of configured grants may be selected according to one or more prioritization rules. In another example embodiment, the one or more prioritization rules may include on-suspended configured grants are prioritized to be selected, among suspended configured grants, the configured grant with the highest numerology, largest bandwidth part, or highest resource allocation is selected, the configured grant with the next allocation in time is selected, the configure grant that can accommodate the most of the data is selected, the configured grant for which a highest priority logical channel with data can be mapped or the logical channel that triggers the buffer status report is selected, or the configured grant is selected by a network.

Figure 4A:
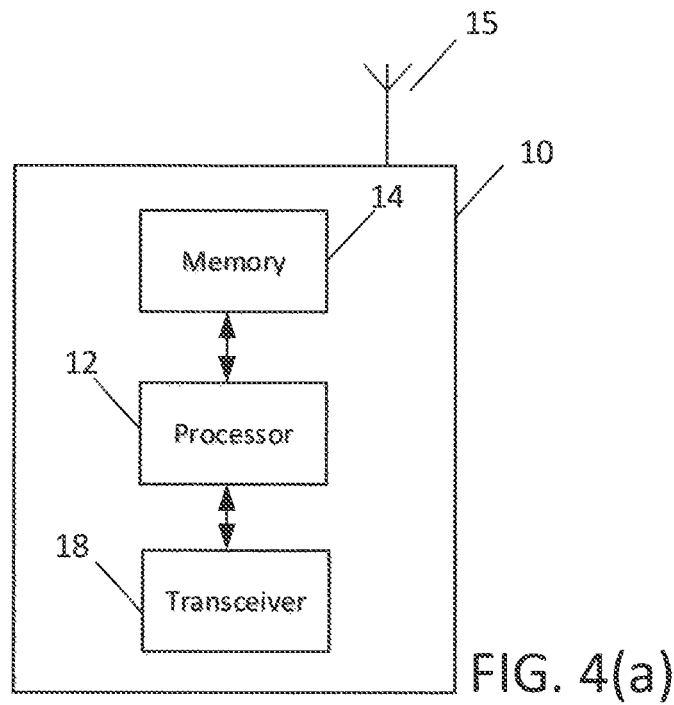
FIG. 4(a) illustrates an apparatus, according to an example embodiment.

FIG. 4(a) illustrates an apparatus 10 according to an example embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 4(a).

As illustrated in the example of FIG. 4(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4(a), multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1 and 2.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1 and 2.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 10 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to determine to transmit, upon data arrival on a logical channel, the data on a configured grant for the logical channel. In addition, apparatus 10 may be controlled by memory 14 and processor 12 to transmit, based on the determination, the data on the configured grant to activate a cell. In an example embodiment, the transmission on the configured grant may be performed regardless of a current activation status of the cell for which the configured grant is configured, or a suspend status of the configured grant.

Figure 4B:
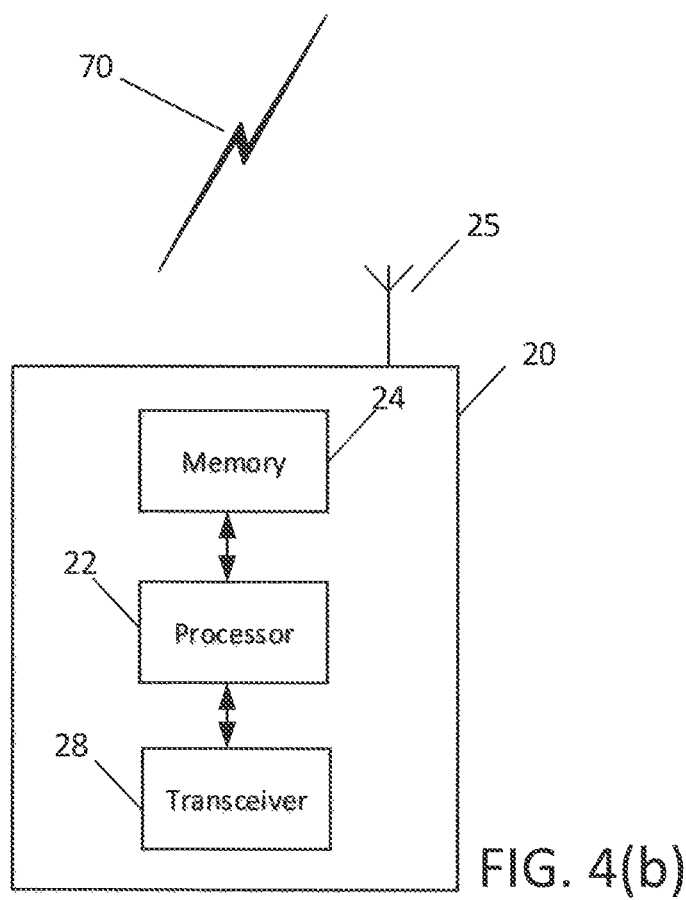
FIG. 4(b) illustrates another apparatus, according to an example embodiment.

FIG. 4(b) illustrates an apparatus 20 according to an example embodiment. In an example embodiment, the apparatus 20 may be a radio resource manager, RAT, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 4(b).

As illustrated in the example of FIG. 4(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4(b), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1 and 3.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1 and 3.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT- LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a radio resource manager, RAT, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in one embodiment, apparatus 20 may be controlled by memory 24 and processor 22 to receive, from a user equipment, a transmission of data on a configured grant for a logical channel. Apparatus 20 may also be controlled by memory 24 and processor 22 to activate a cell in response to receiving the transmission. In an example embodiment, the transmission on the configured grant may be received regardless of a current activation status of the cell for which the configured grant is configured, or a suspend status of the configured grant.

Certain example embodiments described herein provide several technical improvements, enhancements, and/or advantages. In some example embodiments, it may be possible to reduce latency when there is data available for transmission on the SCell compared to sending SR and getting an UL grant, and sending BSR, activating the SCell, and switching—if needed—the BWP to the BWP with the CG for the corresponding LCH. It may also be possible to reduce power consumption by allowing the SCell to be deactivated quickly when there is no data to be transmitted on the SCell without too much activation delay when data becomes available.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

BWP Bandwidth Part
CG Configured Grant
DL Downlink
DRX Discontinuous Reception
eNB Enhanced Node B
FR1 Frequency Range 1
FR2 Frequency Range 2
gNB 5G or NR Base Station
LCH Logical Channel
LTE Long Term Evolution
NR New Radio
PCell Primary Cell
SCell Secondary Cell
SSB Synchronization Signal Block
TAG Timing Advance Group
UE User Equipment

What is claimed is:

1. A method, comprising:
  determining to transmit, upon arrival of data on a logical channel, the data on a configured grant for the logical channel; and
  transmitting, based on the determination, the data on the configured grant to activate a cell,
  wherein the transmission on the configured grant is performed regardless of a current activation status of the cell for which the configured grant is configured, or a suspend status of the configured grant,
  wherein the transmission is performed according to one or more conditions,
  wherein the one or more conditions comprises that the logical channel is not immediately transmitted on any other cell, or that a volume of the data exceeds a configured threshold.

2. The method according to claim 1, wherein the method further comprises switching the cell to one or more bandwidth parts configured with the configured grant when the cell is activated.

3. The method according to claim 1, wherein the cell is in a deactivated state during the determination to transmit the data.

4. The method according to claim 1, wherein the transmitting comprises transmitting a buffer status report to a network node to trigger activation of the cell.

5. The method according to claim 1, wherein the cell enters an activation delay for a set amount of time prior to entering a fully active state with the configured grant.

6. The method according to claim 1,
  wherein the logical channel comprises a plurality of configured grants, and
  wherein a configured grant among the plurality of configured grants is selected according to one or more prioritization rules.

7. The method according to claim 6, wherein the one or more prioritization rules comprises at least one of:
  non-suspended configured grants are prioritized to be selected,
  among suspended configured grants, the configured grant with the highest numerology, largest bandwidth part, or highest resource allocation is selected,
  the configured grant with the next allocation in time is selected,
  the configure grant that can accommodate the most of the data is selected,
  the configured grant for which a highest priority logical channel with data can be mapped or the logical channel that triggers the buffer status report is selected, or
  the configured grant is selected by a network.

8. A method, comprising:
  receiving, from a user equipment, a transmission of data on a configured grant for a logical channel; and
  activating a cell in response to receiving the transmission,
  wherein the transmission on the configured grant is received regardless of a current activation status of the cell for which the configured grant is configured, or a suspend status of the configured grant.

9. An apparatus, comprising:
  at least one processor; and
  at least one non-transitory memory comprising computer program code,
  the at least one memory and the computer program code are configured, with the at least one processor to cause the apparatus at least to:
  determine to transmit, upon arrival of data on a logical channel, the data on a configured grant for the logical channel;
  transmit, based on the determination, the data on the configured grant to activate a cell; and
  switch the cell to a bandwidth part configured with the configured grant when the cell is activated,
  wherein the transmission on the configured grant is performed regardless of a current activation status of the cell for which the configured grant is configured, or a suspend status of the configured grant,
  wherein the transmission is performed according to one or more conditions,
  wherein the one or more conditions comprises that the logical channel is not immediately transmitted on any other cell, or that a volume of the data exceeds a configured threshold.

10. The apparatus according to claim 9, wherein the at least one memory and the computer program code are further configured, with the at least one processor to cause the apparatus at least to switch the cell to one or more bandwidth parts configured with the configured grant when the cell is activated.

11. The apparatus according to claim 9, wherein the cell is in a deactivated state during the determination to transmit the data.

12. The apparatus according to claim 9, wherein the transmitting comprises transmitting a buffer status report to a network node to trigger activation of the cell.

13. The apparatus according to claim 9, wherein the cell enters an activation delay for a set amount of time prior to entering a fully active state with the configured grant.

14. The apparatus according to claim 9,
  wherein the logical channel comprises a plurality of configured grants,
  and wherein a configured grant among the plurality of configured grants is selected according to one or more prioritization rules.

15. The apparatus according to claim 14, wherein the one or more prioritization rules comprises at least one of:
  non-suspended configured grants are prioritized to be selected,
  among suspended configured grants, the configured grant with the highest numerology, largest bandwidth part, or highest resource allocation is selected, the configured grant with the next allocation in time is selected, the configure grant that can accommodate the most of the data is selected, the configured grant for which a highest priority logical channel with data can be mapped or the logical channel that triggers the buffer status report is selected, or the configured grant is selected by a network.

16. An apparatus, comprising:

at least one processor; and at least one non-transitory memory comprising computer program code, the at least one memory and the computer program code are configured, with the at least one processor to cause the apparatus at least to:

receive, from a user equipment, a transmission on a configured grant for a logical channel; and activate a cell in response to receiving the transmission, wherein the transmission on the configured grant is received regardless of an activation status of the cell for which the configured grant is configured, or a suspend status of the configured grant, wherein the transmission is performed according to one or more conditions, wherein the one or more conditions comprises that the logical channel is not immediately transmitted on any other cell, or that a volume of the data exceeds a configured threshold.

\* \* \* \* \*